United States Patent [19]

Tsuchiya et al.

[11] 3,850,034
[45] Nov. 26, 1974

[54] APPARATUS FOR DETECTING PRESSURE DISTRIBUTION

[75] Inventors: Kazuo Tsuchiya; Susumu Usami, both of Nagoya, Japan

[73] Assignee: Kabushiki Kaisha Tokai Rika Denki Seisakusho, Aichi Prefecture, Japan

[22] Filed: June 26, 1973

[21] Appl. No.: 373,808

[30] Foreign Application Priority Data
June 30, 1972  Japan.............................. 47-76503

[52] U.S. Cl.................................. 73/172, 128/2 S
[51] Int. Cl...................... G01m 19/00, A61b 19/00
[58] Field of Search .......... 73/172; 33/3 B; 128/2 S; 350/161, 160 R; 282/1 B

[56] References Cited
UNITED STATES PATENTS
1,692,943  11/1928  Lelyveld ............................... 73/172

2,325,490  7/1943  Elftman ............................. 128/2 S

FOREIGN PATENTS OR APPLICATIONS
691,431  5/1940  Germany ............................ 128/2 S
596,762  5/1934  Germany ............................ 128/2 S Primary Examiner—Richard C. Queisser
Assistant Examiner—Denis E. Corr

[57] ABSTRACT

An apparatus for detecting pressure distribution comprising a transparent plate and a pressure-sensitive structure disposed on the transparent plate, said pressure-sensitive structure comprising a pin holder plate and a plurality of pins each slidably held in said pin holder plate and provided with a lower portion made of a material capable of being resiliently deformed by application of pressure and having a pointed end which is held opposite to the upper surface of said transparent plate.

4 Claims, 4 Drawing Figures

APPARATUS FOR DETECTING PRESSURE DISTRIBUTION

This invention relates to an apparatus for detecting a distribution of pressure exerted by an object and more particularly to an apparatus for detecting a distribution of pressure wherein a plurality of pressure-receiving pins are included in a pressure-sensitive structure and each adapted to be independently depressed.

Some apparatuses of this kind are known and used, for example, for examining the pressure distribution that results with the manual or foot pressure of a crippled person so that he may be furnished with an artificial limb which is suitably designed for him.

This invention will now be more particularly described with reference to the accompanying drawings, in which:

In FIGS. 2 to 4, like portions or parts are designated by like numerals.

Figure 1:
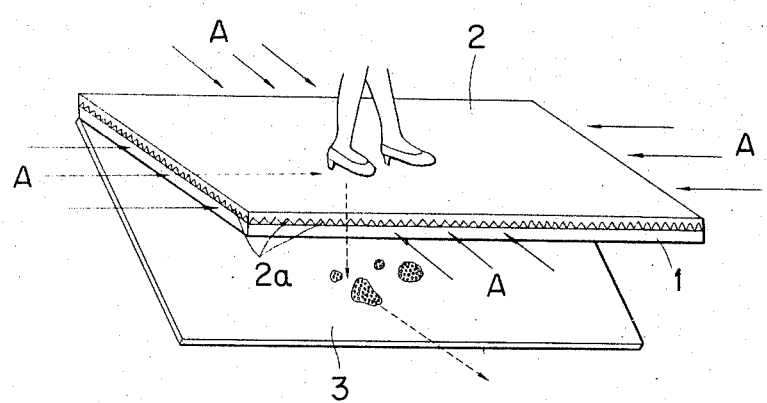
FIG. 1 is a diagrammatic perspective view showing one of conventional pressure distribution detecting apparatuses.

Referring now to FIG. 1, there is shown a typical prior-art apparatus for detecting pressure distribution. Numeral 1 designates a transparent plate made of glass, methacrylic resin, polycarbonate resin or the like. It is illuminated with light in the direction of the arrow A. Numeral 2 designates a mat made of, for example, white silicone resin which has one side with a plurality of pyramidal projections 2a formed thereon. The mat 2 is placed on the transparent plate 1, with the above-mentioned projections 2a held, at their pointed ends, in contact with the transparent 1. Below the transparent plate 1 a mirror 3 is disposed at an angle of 45 degrees with respect to the transparent plate 1.

When a person rides on the mat 2, the projections 2a of the mat made of silicone resin are resiliently deformed by the load. The degree of the deformation depends upon the magnitude of the load. Thus, the projections are deformed according to the pressure distribution due to, for example, the sole of the foot. When a projection 2a is deformed, the light incident on the transparent plate 1 in the direction of arrow A is reflected by the deformed projection 2a and falls on the mirror 3. Thus, the pressure distribution can be observed from the image on the mirror 3. By having a person to walk over the mat and photographing and analysing the changing image it is possible to determine the deviation of the center of gravity of the person that results as he walks, peculiarity in his walk and how his artificial leg fits to him.

The above conventional apparatus, however, uses a single mat 2 and therefore, a pressure applied at one point would diverge to surrounding portions. Therefore, it is difficult to accurately find pressure distribution. In addition, it should be noted that the projections 2a of the mat 2 in contact with the transparent plate 1 tend to considerably deform due to the weight of the mat, thus giving rise to bright spots on the mirror even if no object to be examined is place on the apparatus.

Accordingly, it is an object of the present invention to provide an apparatus for detecting pressure distribution which is responsive exactly only when an object is place thereon.

Another object of the invention is to provide an apparatus of the kind described, which can be adapted to effect easily and speedily the examination.

Still another object of the present invention is to provide an apparatus of the character above, which employs a unit board adapted to receive thereon an object to be examined, a plurality of said unit boards being able to be combined into one board having a desired area.

According to the present invention, there is provided an apparatus for detecting pressure distribution comprising a transparent plate and a pressure-sensitive structure disposed on said transparent plate, characterized in that said pressure-sensitive structure comprises a pin-holding unit board made of a relatively hard material provided with a plurality of holes and having on its underside a support and a plurality of pins each having its lower portion made of a material capable of being resiliently deformed under pressure and slidably held in the hole of said pin-holding unit board, said lower portion of said pin having a pointed end which is held opposite to said transparent plate.

Figure 2:
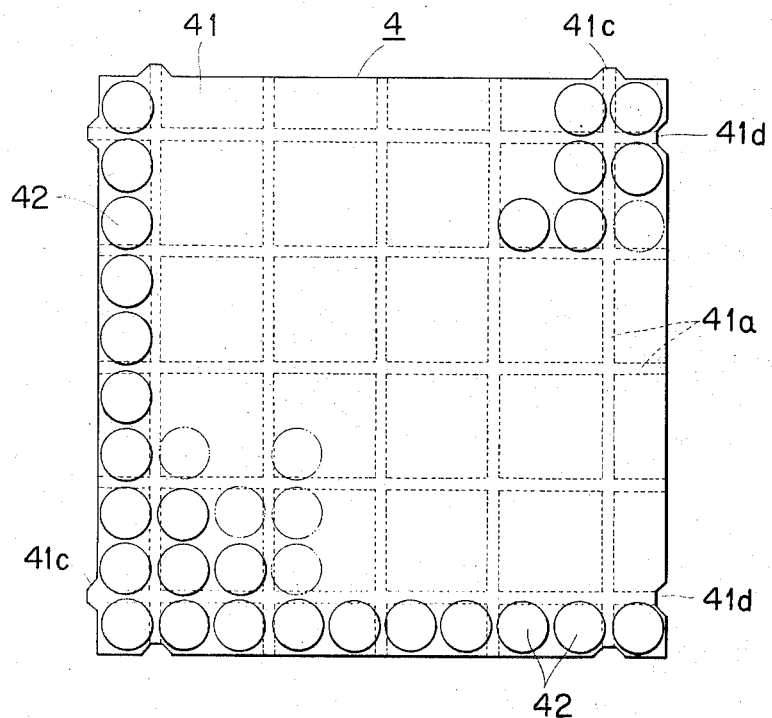
FIG. 2 is a plan view of a unit board employed in a pressure distribution detecting apparatus according to the invention.
Figure 3:
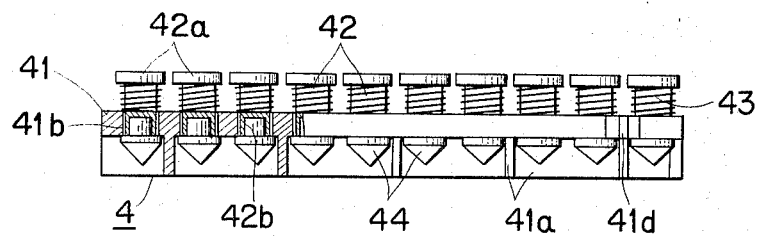
FIG. 3 is a side view of the unit board of FIG. 2, partly shown in cross section.

In FIGS. 2 and 3, there is shown an embodiment of the present invention. Numeral 4 designates a pressure-sensitive structure. Numeral 41 designates a pin-holding board made of a relatively hard material such as a suitable synthetic resin, for example, acrylonitrile-butadiene-styrene. The board 41 has on its underside a support 41a of a lattice-like form and four holes 41b formed within each lattice. The form of the support 41a is also not critical. For example, alternatively, the support 41a may be made in the form of column instead of the lattice-like form. It is preferred that the support 41a is integrally formed with the board 41. The holes 41b serve to receive pins as will be mentioned later. The number of holes 41b is not critical. More the number of holes, more sensitive the pressure distribution detecting apparatus. From a practical point of view, the number of pins, namely the number of holes are appropriately determined. It also has, for example, protuberances 41c and mating recesses 41d for combining it with like boards 41 to a desired size. The coupling of the boards 41 is done by means of adhesive or other suitable means.

Slidably inserted in each hole 41b of the structure 41 is a pin 42 which is provided at its top with a flange 42a and at its lower portion with an axial bore 42b. Each pin 42 is urged upwardly by a spring 43 which acts against the flange 42a and rests on the pin-holding board. Fitted in the axial bore 42b of each pin 42 is a conical or pyramidal projection member 44 at its neck portion. The projection member 44 is made of an easily resiliently deformable material, for example, a natural rubber, a synthetic rubber such as silicone rubber which has a colour capable of reflecting light to distinguish the degree of deformation of the projection member.

The projection member 44 and the support 41a are arranged in such a vertical relationship that the free end of the projection member 44 is positioned leaving a small gap toward the upper surface of the transparent plate 1 when it is held at its upper position by the action of the spring 43, as depicted.

The thus constructed structure 4 is place on the transparent plate 1. When there is no load, the projection members 44 are not in contact with the transparent plate 1 and do not project any image upon the mirror 3, but the support 41a is in contact with the transparent plate 1 so that it projects its image on the mirror 3. The image of said support 41a, however, can be clearly distinguished from that of a projection member 44 which is brought into contact with said transparent plate by the load applied thereon, so that no problem is encountered in this connection. Furthermore, it is noted that when the underside of the support 41a is blackened its image will not appear on the mirror 3.

When a person walks on the structure 4, only the pins 42 carrying thereon the load or pressure are lowered against the spring force of the associated springs 43, and the projection members 44 fittedly provided at the lower end of these pins are brought into contact with the transparent plate 1 and resiliently deformed according to magnitude of the load, so that the deformed members project their image on the mirror 3. From the image thus projected on the mirror 3 the distribution of the load on these pins can be determined. When the load is removed, the pins 42 with the respective projection members 44 are restored to their rest position by the action of the respective spring 43 in which said projection members 44 are held out of contact with said transparent plate 1. In this state, therefore, no bright spot is seen.

While the foregoing description is concerned with one embodiment applied to the case of examining pressure distribution due to the foot of a crippled person as he walks, the apparatus according to the present invention may of course be applied to various other purposes.

While in the above embodiment the pin 42 and projection member 44 are constituted as separate members, it is possible to make them integral with each other.

Figure 4:
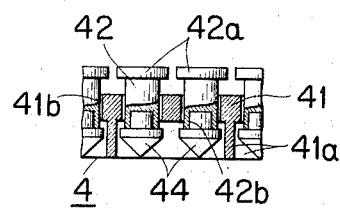
FIG. 4 is a partly cut-away side view of another form of unit board employed in an apparatus embodying the present invention.

Referring now to FIG. 4, there is shown another form of a pressure-sensitive structure in which a pin 42 is slidably inserted in a hole 41b, with the spring 43 as shown in FIG. 3 removed. In this structure, a projection member 44 made of resiliently deformable material and attached to a pin 42 is slightly in contact, at its pointed end, with the surface of the transparent plate 1. As opposed to the mat 2 with the projections 2a which is conventionally used, the pin 42 is very small in weight and hence, the projection member 44 is hardly deformed without pressure applied onto the pin 42 at its flange portion 42a. With such structure, therefore, the exact and precise determination of a pressure distribution can be effected.

Although, in the above-mentioned two embodiments, the unit board is constructed of a single board with holes formed therein and a support provided therebelow, it is possible alternatively to first provide a support of a lattice-form and second provide a holed plate member such as a meshed member on each section of the lattice-formed support so that a unit board for holding a plurality of pins is formed.

As described, according to the present invention, a specific pressure-sensitive structure in which a plurality of pins each with its lower portion made of a resiliently deformable material and having a pointed end are, independently of each other, supported slidably by a unit board is placed on the transparent plate so that the pointed ends of the pins are held opposite to the upper surface of the transparent plate. Thus, it is possible to clearly distinguish the images of the projection members or the lower portions of the pins on which pressure is applied and exactly and precisely detect a pressure distribution.

What is claimed is:

1. An apparatus for detecting pressure distribution comprising a transparent plate and a pressure-sensitive structure disposed on said transparent plate, characterized in that said pressure-sensitive structure comprises a pin-holding unit board made of a relatively hard material provided with a plurality of holes and having on its underside a support and a plurality of pins each having its lower portion made of a material capable of being resiliently deformed under pressure and slidably held in the hole of said pin-holding unit board, said lower portion of said pin having a pointed end which is held opposite to said transparent plate.

2. An apparatus according to claim 1 is wherein said pin-holding unit board is made of a single board.

3. An apparatus according to claim 1, wherein said pin-holding unit board is composed of a plurality of members.

4. An apparatus according to claim 1, wherein a plurality of the pin-holding unit boards are combined to form a board of a desired area.

* * * * *